(12) United States Patent
Gupta et al.

(10) Patent No.: US 11,044,248 B2
(45) Date of Patent: Jun. 22, 2021

(54) METHOD AND DEVICE FOR FACILITATING MUTUAL AUTHENTICATION BETWEEN A SERVER AND A USER USING HAPTIC FEEDBACK

(71) Applicant: Symbol Technologies, LLC, Holtsville, NY (US)

(72) Inventors: Nitin Gupta, Bangalore (IN); Sundaresan Sundaram, Bangalore (IN)

(73) Assignee: Symbol Technologies, LLC, Holtsville, NY (US)

( * ) Notice: Subject to any disclaimer, the term of this patent is extended or adjusted under 35 U.S.C. 154(b) by 1038 days.

(21) Appl. No.: 14/026,253

(22) Filed: Sep. 13, 2013

(65) Prior Publication Data

US 2015/0082401 A1    Mar. 19, 2015

(51) Int. Cl.
*H04L 29/06*    (2006.01)

(52) U.S. Cl.
CPC ........ *H04L 63/0861* (2013.01); *H04L 63/083* (2013.01); *H04L 63/0869* (2013.01)

(58) Field of Classification Search
CPC ............... H04L 63/0861; H04L 63/083; H04L 63/0869
USPC ......................................................... 705/50
See application file for complete search history.

(56) References Cited

U.S. PATENT DOCUMENTS

| 7,180,401 B2 | 2/2007 | Kurtz | |
| 7,486,273 B1* | 2/2009 | Aviles | G06F 3/016 345/156 |
| 8,279,052 B2 | 10/2012 | Heubel et al. | |
| 8,549,087 B2* | 10/2013 | Leonard | H04L 63/1433 709/206 |
| 8,924,726 B1* | 12/2014 | Hodgman | G09C 5/00 380/243 |
| 8,966,582 B1* | 2/2015 | Ainslie | H04L 63/14 726/2 |
| 9,251,540 B1* | 2/2016 | Magee | G06Q 40/02 |
| 9,317,848 B2* | 4/2016 | Hammad | G06Q 20/42 |
| 2007/0118484 A1* | 5/2007 | Borenstein | G06Q 10/10 705/75 |
| 2008/0235788 A1 | 9/2008 | El Saddik et al. | |

(Continued)

FOREIGN PATENT DOCUMENTS

| CN | 101939750 A | 1/2011 |
| CN | 102542908 A | 7/2012 |

(Continued)

OTHER PUBLICATIONS

International Search Report and Written Opinion of corresponding International Patent Application No. PCT/US2014/052284 dated Oct. 29, 2014.

(Continued)

*Primary Examiner* — James D Nigh

(57) ABSTRACT

A method is provided for facilitating mutual authenticating between a server and a user of a haptic enabled device. The method comprises providing identity information of a user to a server, and in response, providing a haptic feedback output to the user corresponding to the identity information. Further, the user compares the haptic feedback output received from the server to a haptic feedback pattern as predefined by the user, to determine whether the server is authenticated or not.

15 Claims, 5 Drawing Sheets

(56) References Cited

U.S. PATENT DOCUMENTS

| | | | |
|---|---|---|---|
| 2009/0153292 A1* | 6/2009 | Farb | G06F 21/41 340/5.52 |
| 2010/0036620 A1 | 2/2010 | Gross et al. | |
| 2010/0161468 A1* | 6/2010 | Hickman | G06Q 40/00 705/35 |
| 2010/0269162 A1* | 10/2010 | Bravo | G06F 21/31 726/6 |
| 2010/0306819 A1* | 12/2010 | Nahari | G06F 21/554 726/2 |
| 2011/0102332 A1 | 5/2011 | Birnbaum et al. | |
| 2012/0095919 A1* | 4/2012 | Hart | G06Q 20/12 705/44 |
| 2012/0218089 A1* | 8/2012 | Hill | H04M 1/72457 340/407.1 |
| 2012/0274662 A1 | 11/2012 | Kim et al. | |
| 2012/0302323 A1* | 11/2012 | Gagner | G07F 17/3202 463/25 |
| 2013/0036000 A1* | 2/2013 | Giordano | G06Q 40/02 705/14.27 |
| 2013/0054417 A1* | 2/2013 | O'Donoghue | G06Q 20/3278 705/26.43 |
| 2013/0151419 A1 | 6/2013 | Hitchcock et al. | |
| 2013/0160098 A1* | 6/2013 | Carlson | G06F 21/45 726/6 |
| 2013/0333032 A1* | 12/2013 | Delatorre | H04L 63/1441 726/23 |
| 2014/0058937 A1* | 2/2014 | Watson | G06Q 20/204 705/41 |
| 2014/0067673 A1* | 3/2014 | Lanrok | G06Q 20/4016 705/44 |
| 2014/0123261 A1* | 5/2014 | Blair | H04L 51/00 726/7 |
| 2014/0292635 A1* | 10/2014 | Vetek | G06F 21/31 345/156 |
| 2015/0039898 A1* | 2/2015 | kowalski | H04L 9/3234 713/184 |
| 2015/0128243 A1* | 5/2015 | Roux | H04L 9/0877 726/9 |

FOREIGN PATENT DOCUMENTS

| | | | | |
|---|---|---|---|---|
| CN | 102982269 A | 3/2013 | | |
| EP | 2096830 A1 | 9/2009 | | |
| GB | 2507315 A | * | 4/2014 | H04L 51/00 |
| GB | 2507315 A | * | 4/2014 | H04L 51/00 |
| JP | 2013080414 A | 5/2013 | | |
| KR | 100964876 B1 | 6/2010 | | |
| WO | 2012158803 A1 | 11/2012 | | |

OTHER PUBLICATIONS

Office Action for Korean Patent Application No. 10-2016-7009439 dated Oct. 12, 2017.

Office Action for Chinese Patent Application No. 201480050506.1 dated Feb. 5, 2018.

* cited by examiner

METHOD AND DEVICE FOR FACILITATING MUTUAL AUTHENTICATION BETWEEN A SERVER AND A USER USING HAPTIC FEEDBACK

FIELD OF THE DISCLOSURE

The present disclosure relates to a method and system for facilitating mutual authentication between a server and a user of a haptic enabled device in a communication system.

BACKGROUND

Users very often interact with systems that are remotely connected to perform some transactions. For example, in financial transactions, users are required to share their identify information with the remote system to complete their transaction. Identity information of a user may be in the form of a personal identification number (PIN), password, audio identifier, etc. Remote systems employ dedicated servers to receive such identity information from the users for authentication. The verification of identity information allows the systems to authenticate the users, but in most cases, the systems do not provide their own authenticity information to the user. Such servers employed by the remote systems are prone to attacks and it is possible that it may lead to misuse of any additional sensitive information received from the user. For example, when a user is interacting with an automatic teller machine (ATM), the user enters a PIN for authenticating himself to the ATM, but there is no way for the user to know if he is interacting with a genuine system.

In existing systems, authentication of a server is generally achieved using Secure Sockets Layer (SSL) certificates installed on a device. This scheme works fine when two devices need to authenticate each other. However, when human interaction is involved, it is not straightforward to achieve mutual authentication between the server and the user.

Accordingly, there is a need for a method of facilitating mutual authentication between a server and a user in a communication system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
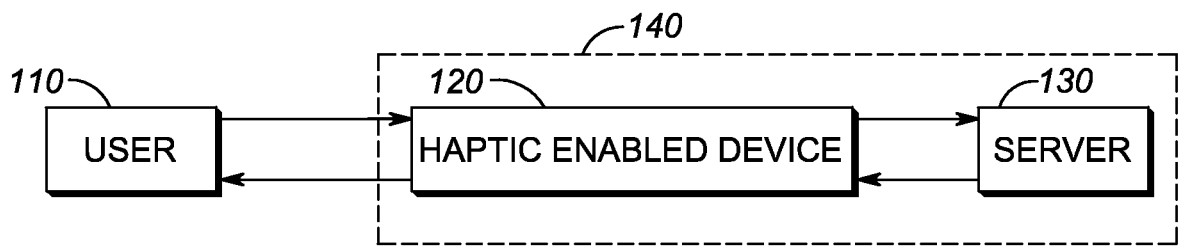
FIG. 1 is a system diagram of a mutual authentication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The following detailed description is merely illustrative in nature and is not intended to limit the embodiments of the subject matter or the application and uses of such embodiments. Furthermore, there is no intention to be bound by any expressed or implied theory presented in the preceding technical field, background, brief summary or the following detailed description.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to touch sensing, touch screen calibration and/or configuration, touch screens, user identification and/or authentication, artificial neural networks, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

The subject disclosure describes a method of facilitating mutual authentication between a server and a user of a haptic enabled device. The haptic enabled device receives identity information of the user and transmits the identity information to the server. The server accesses a database to identify a haptic feedback pattern, predefined by the user, corresponding to the identity information of the user. Further, the server transmits the haptic feedback pattern to the haptic enabled device. The haptic enabled device generates a haptic feedback output, corresponding to the haptic feedback pattern, for the user to compare with the haptic feedback pattern as predefined by the user, and therefore to determine whether the server is authenticated or not.

FIG. 1 depicts a mutual authentication system 100 suitable for use in accordance with the disclosed embodiments. The mutual authentication system 100 comprises a user 110, a haptic enabled device 120, and a server 130. In accordance with the embodiments of the present disclosure, the user 110 interacts with the haptic enabled device 120 and provides his or her identity information to the haptic enabled device 120. The haptic enabled device is further communicatively coupled to the server 130, and transmits the identity information of the user 110 to the server 130. The server 130 identifies a corresponding haptic feedback pattern, as predefined by the user 110, and transmits the haptic feedback pattern to the haptic enabled device 120. Further, the haptic enabled device 120 generates a haptic feedback output for the user 110 to determine whether the server 130 is authenticated.

In accordance with the embodiments of the present disclosure, the haptic enabled device 120 is designed to communicate with the server 130 over a wireless or a wired interface to at least transmit the identity information of the user 110 to the server 130, and to receive the predefined haptic feedback pattern from the server 130. The haptic enabled device 120 may be realized as any computing device, such as, a computer, mobile device (e.g., cellular phone, personal digital assistant, etc.), automated teller machine, credit card reader, cash register, and the like, capable of providing haptic feedback output to the user 110.

Further, the server 130 is communicatively coupled to the haptic enabled device 120 to provide haptic feedback pattern corresponding to the identity information of the user 110 received from the haptic enabled device 120. It should be understood that FIG. 1 is a simplified representation of the mutual authentication system 100 for purposes of explanation and is not intended to limit the scope of the subject matter in any way. In this regard, although FIG. 1 depicts the server 130 as being a separate entity, but communicatively coupled to the haptic enabled device 120 (e.g., via a wireless link), however, in practice, the server 130 may reside at the haptic enabled device 120, and the server 130 and the haptic enabled device 120 may function as a single entity 140. In various embodiments, the server 130 may be realized, without limitation, as a payment server, a financial transactional server, or a server operable in a specific environment (such as a retail store, an enterprise, medical environment, etc.), and the like, which the user 110 intends to authenticate using haptic feedback.

Figure 2:
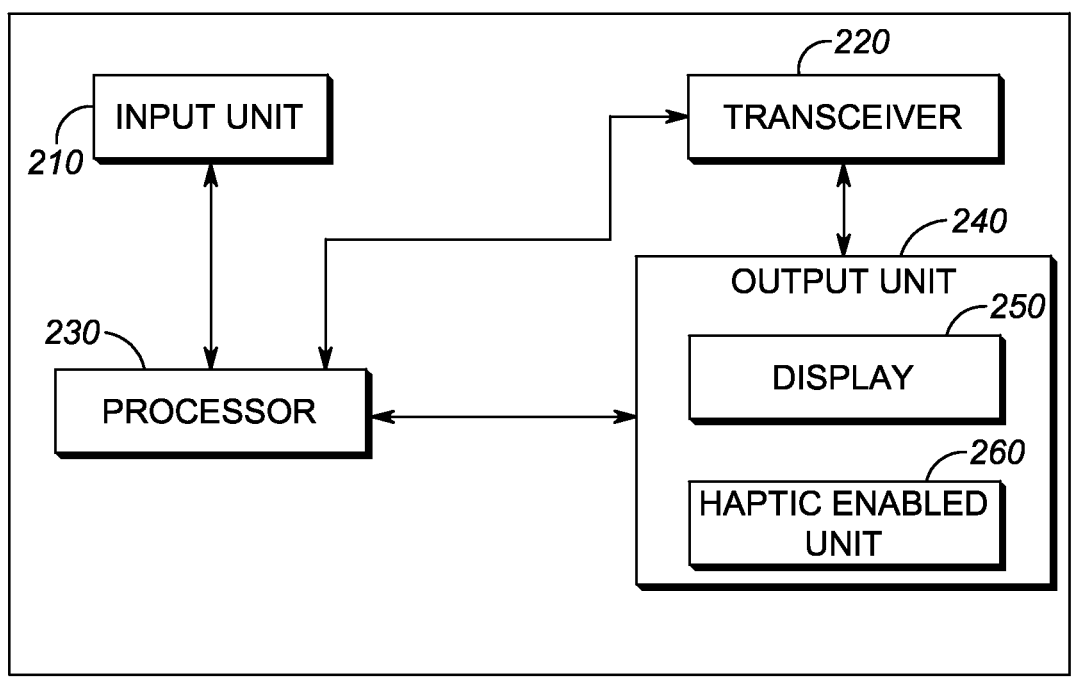
FIG. 2 is a block diagram illustrating a haptic enabled device employed in the mutual authentication system of FIG. 1 in accordance with some embodiments.

FIG. 2 depicts a block diagram of a device 200 suitable for use as the haptic enabled device 120 in the mutual authentication system 100 of FIG. 1 in accordance with the disclosed embodiments. In accordance with the embodiments of the present disclosure, the device 200 receives identity information from the user 110 and transmits the received identity information to the server 130. In response, the device 200 receives a predefined haptic feedback pattern corresponding to the identity information of the user 110 from the server 130. The device further generates a haptic feedback output corresponding to the predefined haptic feedback pattern for the user 110 to determine whether the server 130 is authenticated. In accordance with the disclosed embodiments, the device 200 includes, without limitation, an input unit 210, a transceiver 220, a processor 230, and an output unit 240.

The input unit 210 is configured to receive identity information of the user 110. The input unit 210 may be realized as a keypad, keyboard, touch panel, pressure sensitive surface, card reader (e.g., a credit card reader, debit card reader, access card reader, smart card reader, and the like), barcode reader, radio-frequency identification (RFID) reader, magnetic stripe reader, mouse, joystick, knob, microphone, or another suitable device, configured to at least receive the identity information from the user 110. The identity information may be obtained by the input unit 210 by a user swiping a card containing identification information (e.g., an access card, credit card, debit card, or the like), or by a user manually entering his or her identification information via a keypad and/or a touch panel, or by a user providing an input corresponding to a pressure profile of the user, and the like. Further, the input unit 210 provides the received identity information to the processor 230.

The processor 230 includes one or more microprocessors, microcontrollers, DSPs (digital signal processors), state machines, logic circuitry, or any other device or devices that process information based on operational or programming instructions. Such operational or programming instructions (not shown) are stored in a memory (not shown). The memory can be an IC (integrated circuit) memory chip containing any form of RAM (random-access memory), a floppy disk, a CD-RW (compact disk with read write), a hard disk drive, a DVD-RW (digital versatile disc with read write), a flash memory card, external subscriber identity module (SIM) card or any other medium for storing digital information. One of ordinary skill in the art will recognize that when the processor 230 has one or more of its functions performed by a state machine or logic circuitry, the memory containing the corresponding operational instructions can be embedded within the state machine or logic circuitry. The processor 230 is configured to transmit the identity information received from the input unit 210 to the transceiver 220.

The transceiver 220 may be realized as an interface equipped with one or more of combinations of a transmitter and receiver circuitry, an antenna, a wired interface, a radio interface, and/or any additional components enabling the device 200 to be communicatively coupled to the server 130. In accordance with the disclosed embodiments, the transceiver 220 transmits the identity information to the server 130, and further receives a corresponding haptic feedback pattern from the server 130. In an embodiment, the haptic feedback pattern received from the server 130 is securely encrypted. The processor 230 may be equipped with appropriate decryption circuitry to successfully decrypt the haptic feedback pattern received from the transceiver 220. The processor 230 is further configured to generate a haptic feedback output at the output unit 240 corresponding to the haptic feedback pattern received from the transceiver 220.

In accordance with the disclosed embodiments, the output unit 240 is configured to provide the haptic feedback output generated by the processor 230 to the user 110. In various embodiments, the output unit 240 may be realized as a display screen, audio device, touch screen, or another suitable device. The output unit 240 comprises, without limitation, a display 250 and a haptic enabled unit 260. It should be understood that FIG. 2 is a simplified representation of the device 200 for purposes of explanation and is not intended to limit the scope of the subject matter in any way. In this regard, although FIG. 2 depicts the haptic enabled unit 260 as being part of the device 200, in practice, the haptic enabled unit 260 may be separate but communicatively coupled to the device 200 (e.g., via a wired link).

The haptic enabled unit 260 may be realized as a touch screen or a touch panel, a display, a haptic pad, a haptic enabled palm glove, and the like, capable of providing haptic feedback output to the user 110. The term "haptic" refers to touch or tactile sensation, and the haptic enabled unit 260 refers to a system configured to provide a selective tactile feedback sensation (such as a vibration or other physical sensation, etc.) for a user interacting with the haptic enabled device 120. In embodiments of the present disclosure, the haptic enabled unit 260 includes a haptic feedback surface and one or more actuators (such as piezoelectric transducers, electromechanical devices, and/or other vibration inducing devices) that are mechanically connected to the haptic feedback surface to generate haptic feedback output on the haptic feedback surface. The processor 230 is coupled to one or more actuators and causes the actuators to induce a sequence of vibrations, corresponding to the haptic feedback pattern received from the server 130, into the haptic feedback surface of the haptic enabled unit 260, thereby providing the haptic feedback output to the user 110.

Further, in various embodiments, the haptic enabled unit 260 may be designed as a centralized haptic enabled device or a localized haptic enabled device. A centralized haptic enabled device has a single actuator that vibrates the whole device or a haptic feedback surface, rather than an individual section, to provide haptic feedback output to a user. Such devices offer essentially no localization of the haptic feedback. However, a localized haptic enabled device has multiple actuators that are distributed along the haptic feedback surface (such as a touch screen, etc.), each at a separate contact location, allowing the haptic feedback output to be localized to the separate contact locations, rather than the whole device or the haptic feedback surface.

The term "haptic feedback output" as used herein refers to a tactile feedback sensation (such as a vibration or other physical sensation, etc.) provided to a user via the haptic enabled unit 260. The haptic feedback output comprises at least one of a sequence of vibrations and a sequence of motions. In embodiments implementing the localized haptic enabled devices, the haptic feedback output comprises a sequence of localized vibrations, wherein the sequence of localized vibrations is a function of at least one of a location (x,y), time duration (t), and magnitude (m) of the haptic feedback output provided on the haptic feedback surface of the haptic enabled unit 260. In these embodiments, the processor 230 is configured to identify one or more contact locations within the haptic feedback surface based on the haptic feedback pattern received from the server 130. The processor 230 further selectively activates the actuators corresponding to the identified contact locations to generate haptic feedback output for the user 110. The processor 230 is also configured to control the magnitude and time duration of the generated haptic feedback output based on the received haptic feedback pattern.

Figure 3:
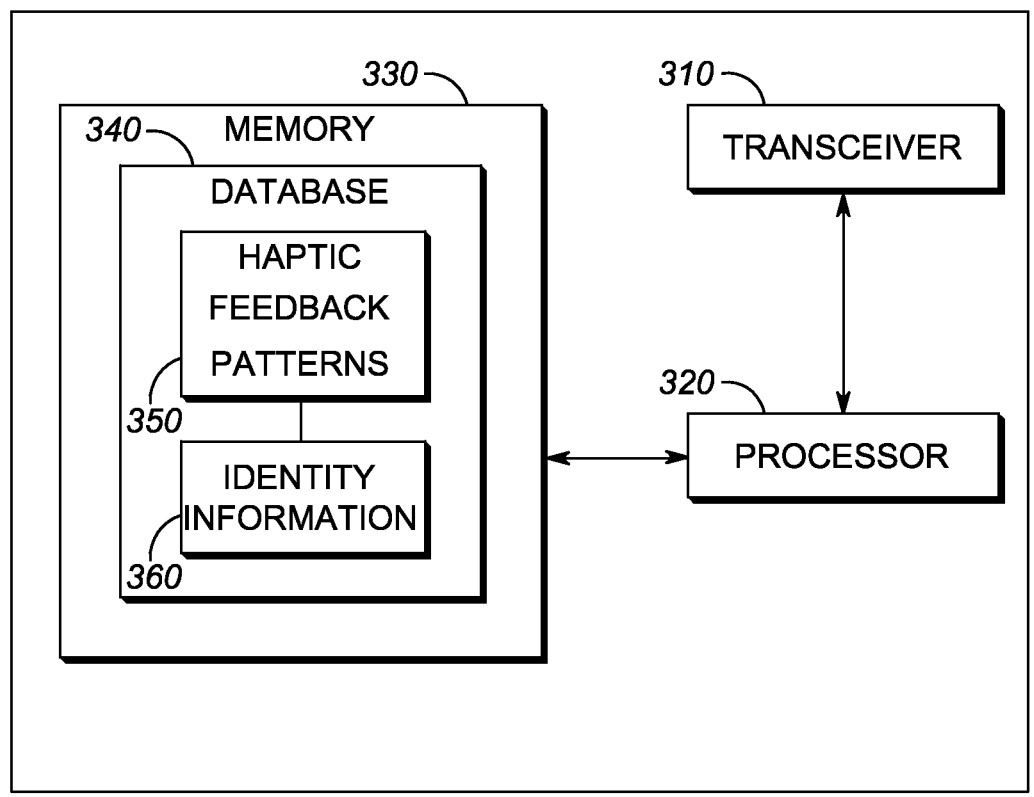
FIG. 3 is a block diagram illustrating a server employed in the mutual authentication system of FIG. 1 in accordance with some embodiments.

FIG. 3 depicts a block diagram of a server 300 suitable to function as the server 130 in the mutual authentication system 100 of FIG. 1 in accordance with the disclosed embodiments. The server 300 is communicatively coupled to the haptic enabled device 120 via a wireless and/or a wired link to receive identity information of the user 110 and further transmit a haptic feedback pattern, corresponding to the identity information, to the haptic enabled device 120. The server 300 includes, without limitation, a transceiver 310, a processor 320, and a memory 330.

The transceiver 310 enables the server 130 to be communicatively coupled to the haptic enabled device 120. The transceiver 310 is configured to receive the identity information of the user 110 from the haptic enabled device 120, and transmit a predefined haptic feedback pattern, corresponding to the identity information, to the haptic enabled device 120. The transceiver may be realized as an interface equipped with one or more of combinations of a transmitter and receiver circuitry, an antenna, a wired interface, a radio interface, and/or any other additional components required to communicatively couple the server 300 with the haptic enabled device 120.

The processor 320 includes one or more microprocessors, microcontrollers, DSPs (digital signal processors), state machines, logic circuitry, or any other device or devices that process information based on operational or programming instructions. Such operational or programming instructions (not shown) are stored in the memory 330. The memory 330 can be an IC (integrated circuit) memory chip containing any form of RAM (random-access memory), a floppy disk, a CD-RW (compact disk with read write), a hard disk drive, a DVD-RW (digital versatile disc with read write), a flash memory card, external subscriber identity module (SIM) card or any other medium for storing digital information. One of ordinary skill in the art will recognize that when the processor 320 has one or more of its functions performed by a state machine or logic circuitry, the memory 330 containing the corresponding operational instructions can be embedded within the state machine or logic circuitry.

The memory 330 comprises, without limitation, a database 340 of haptic feedback patterns 350 and identity information 360. It should be understood that FIG. 3 is a simplified representation of the server 300 for purposes of explanation and is not intended to limit the scope of the subject matter in any way. In this regard, although FIG. 3 depicts the database 340 as being part of the memory 330 of the server 300, in practice, the database 340 may be stored at a remote location separate from the memory 330, but accessible by the server 300. The processor 320 is configured to access the database 340 to identify a haptic feedback pattern, as predefined by the user 110, corresponding to the received identity information of the user 110.

In various embodiments, a user predefines the haptic feedback pattern at the time of registration or subscription as a new user, and/or later while updating the server database with user related information or services, and the like. The haptic feedback pattern as defined by the user is then correlated to the identity information of the user, and stored in the database 340, accessible by the server 300. The haptic feedback pattern, in accordance with the embodiments of the present disclosure, will be explained in further detail with reference to FIG. 6.

Further, the term "identity information," as used herein, refers to a personal identification number (PIN), a password, an audio identifier, a signature, a pressure profile, and the like, of a user. The identity information of a user is used as a unique identifier by the server 300 to authorize the user, provide user specific services, access pre-stored information related to the user, and the like. The server 300 uses the identity information of the user 110 to identify the corresponding predefined haptic feedback pattern, and transmits the haptic feedback pattern to the haptic enabled device 120. In one embodiment, the server 300 may be equipped with encryption circuitry to securely encrypt the haptic feedback pattern before transmitting to the haptic enabled device 120 for authentication.

Figure 4:
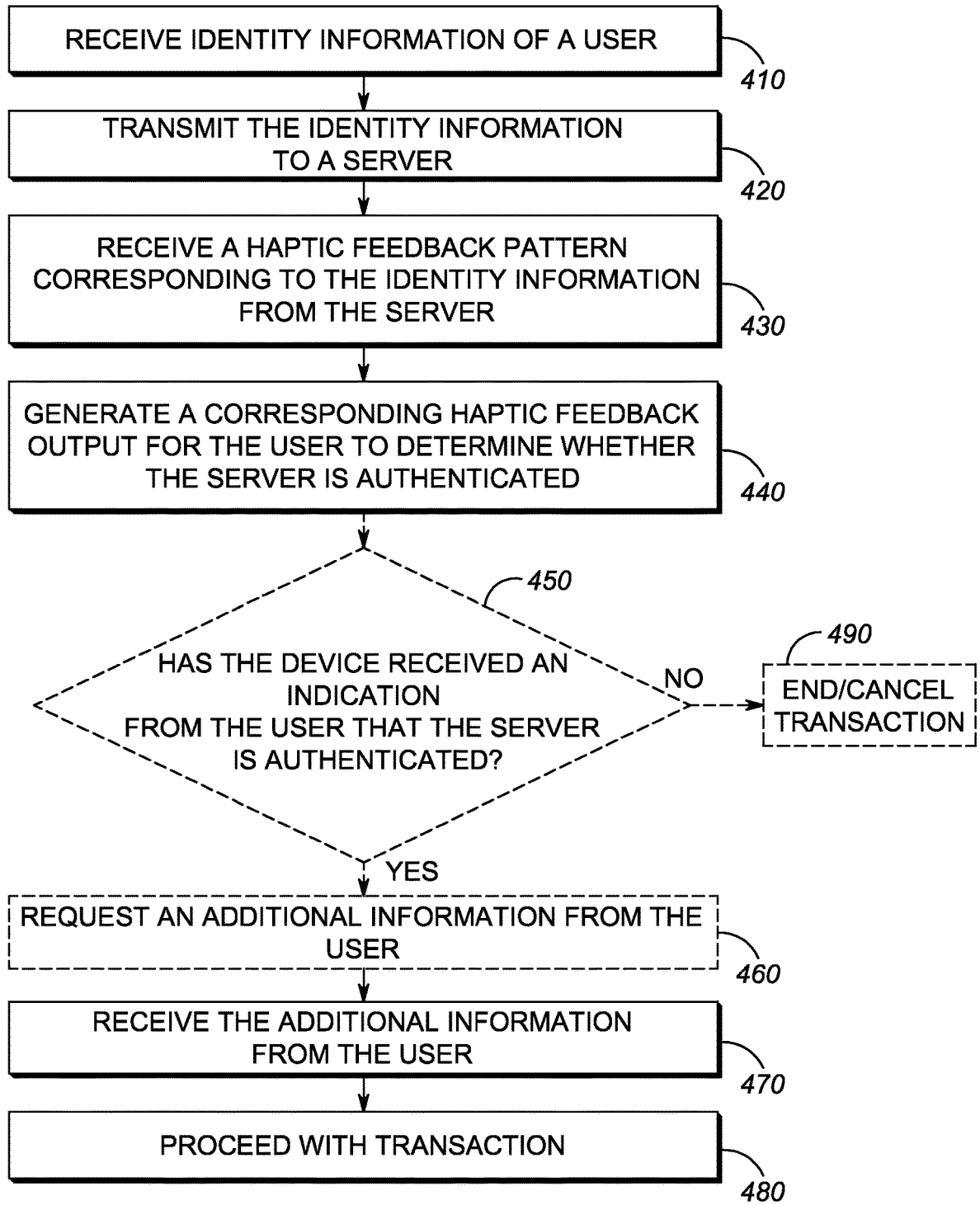
FIG. 4 illustrates a flowchart of a method for facilitating mutual authentication between a server and a user, performed at a haptic enabled device in accordance with some embodiments.

FIG. 4 depicts a mutual authentication process 400 that is performed at the haptic enabled device 120 (FIG. 1) to authenticate the server 130, by verifying that a haptic feedback output provided to the user 110 via the haptic enabled device 120 matches with a haptic feedback pattern predefined by the user 110 and stored at the server 130, to subsequently allow the user 110 to authenticate the server 130.

In accordance with the mutual authentication process 400, the haptic enabled device 120 receives the identity information of the user 110 (block 410). Further, the haptic enabled device 120 transmits the received identity information to the server 130 (block 420). In response to transmitting the identity information to the server 130, the haptic enabled device 120 receives a haptic feedback pattern corresponding to the identity information of the user 110 from the server 130 (block 430). The process of identifying the haptic feedback pattern corresponding to the identity information of the user, at the server, will be explained in detail with reference to FIG. 5.

After receiving the haptic feedback pattern, the haptic enabled device 120 generates a corresponding haptic feedback output for the user 110 to determine whether the server 130 is authenticated (block 440). The haptic enabled device 120 provides the generated haptic feedback output to the user 110 via the haptic enabled unit 260. For example, the user 110 may place his or her palm on a haptic feedback surface that is a part of or coupled to the haptic enabled device 120, to receive the haptic feedback output. Further, the user 110 detects the haptic feedback output received from the haptic enabled device 120, and compares it to the haptic feedback pattern predefined by the user 110. The user 110, based on the comparison, makes a determination whether the user 110 is interacting with the authentic server or not. That is, if the haptic feedback output received from the haptic enabled device 120 matches with the haptic feedback pattern predefined by the user 110, then the user 110 makes a determination that the server 130 is authenticated.

Continuing with the mutual authentication process 400, the haptic enabled device 120 determines whether a confirmation or an indication is received from the user 110 that the server 130 is authenticated (block 450). In this embodiment, this confirmation may be received in response to a message provided to the user 110 by the haptic enabled device 120. The message may be, without limitation, a question asking the user whether he or she wishes to continue or not, and/or providing an option to exit a current transactional process, and the like. The message may be provided to the user 110 in various formats, such as by displaying the message on a display screen, providing an audio message, and the like.

Returning to block 450, when the haptic enabled device 120 receives a confirmation or an indication from the user 110 that the server 130 is authenticated, the haptic enabled device 120 proceeds to request an additional information from the user 110 (block 460). The term "additional information" as used herein refers to information required to complete a transaction. In various embodiments, additional information may refer to any sensitive or personal information corresponding to a user and/or uniquely identifying the user, required to complete a financial transaction. The process of mutual authentication, as described herein, enables a user to authenticate the server before providing the additional information, in order to prevent any misuse of the additional information by server hackers, and the like.

Further, in response to the request for additional information from the user 110, the haptic enabled device 120 then receives the additional information from the user 110 (block 470). After receiving the additional information, the haptic enabled device 120 proceeds with the current process, which, without limitation, may be a financial transaction process (block 480). Alternatively, returning to block 450, if the haptic enabled device 120 does not receive an indication or a confirmation from the user 110 that the server 130 is authenticated, (for example, receives an input from the user 110 that the server 130 is not authenticated, or the user 110 exits the transactional process, and the like), the current process is ended and/or a transaction is canceled (block 490).

In an alternate embodiment, at block 450, the haptic enabled device 120 may not receive any explicit confirmation or indication from the user 110 that the server 130 is authenticated. In this case, the user 110 after being satisfied that the haptic feedback output provided by the haptic enabled device 120 matches with his or her predefined haptic feedback pattern, may proceed to directly enter additional information as shown in block 470. Alternatively, the user 110 may proceed to directly end/cancel the transaction process if he or she determines that the haptic feedback output does not match with the predefined haptic feedback pattern, that is, the server 130 is not an authentic server.

Figure 5:
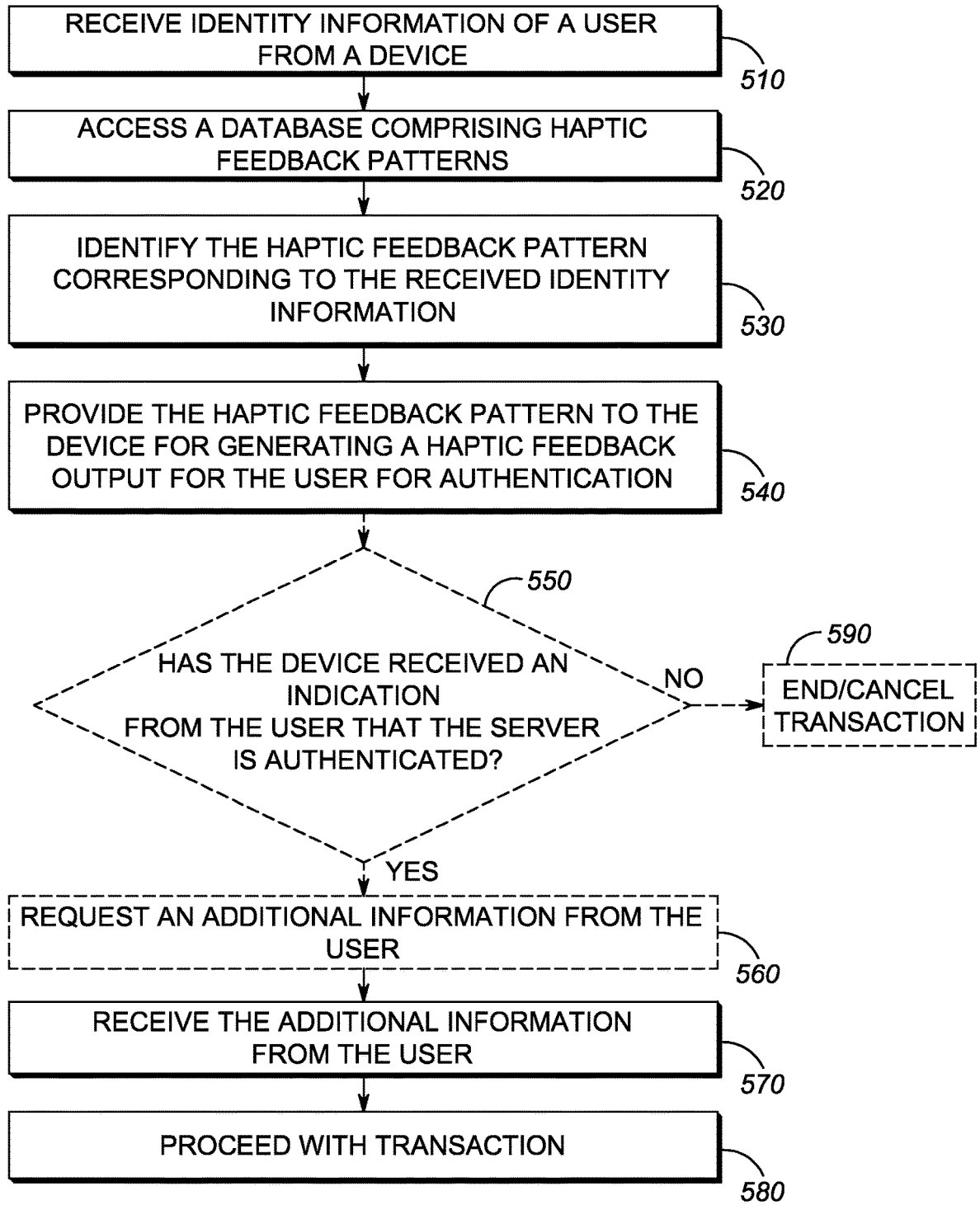
FIG. 5 illustrates a flowchart of a method for facilitating mutual authentication between a server and a user, performed at the server in accordance with some embodiments.

FIG. 5 depicts a mutual authentication process 500, in accordance with the mutual authentication process 400 of FIG. 4, performed at a server 130 (FIG. 1) to facilitate mutual authentication between the user 110 and the server 130.

At block 510, the server 130 receives the identity information of the user 110 from the haptic enabled device 120. After receiving the identity information of the user 110, the server 130 accesses the database 340 comprising identity information of a plurality of users and the corresponding haptic feedback patterns as predefined by the plurality of users (block 520). The server 130 further identifies a haptic feedback pattern corresponding to the identity information of the user 110 by accessing the database 340 (block 530). In various embodiments, the database 340 comprises, at least, a list of unique identifiers (identity information) of a plurality of users listed against the corresponding haptic feedback patterns as predefined by the plurality of users. In order to identify the haptic feedback pattern corresponding to the user 110, the server 130 accesses the database 340 and refers to the received identity information of the user 110 to identify the haptic feedback pattern listed against the received identity information.

Continuing with the mutual authentication process 500, the server 130 provides the identified haptic feedback pattern to the haptic enabled device 120 for generating a haptic feedback output for the user 110 (block 540). In various embodiments, the server 130 securely encrypts the haptic feedback pattern before transmitting it to the haptic enabled device 120.

After receiving the haptic feedback pattern from the server 130, the haptic enabled device 120 generates a corresponding haptic feedback output to be provided to the user via the haptic enabled unit 260, in a similar manner as set forth above in the context of FIG. 4 (e.g., block 440). The user 110 then compares the haptic feedback output with the haptic feedback pattern predefined by the user 110, to determine whether the user 110 is interacting with an authentic server or not.

In response to providing the haptic feedback output to the user 110, the haptic enabled device 120 then determines whether a confirmation or an indication is received from the user 110 that the server 130 is authenticated (block 550), in a similar manner as set forth above in the context of FIG. 4 (e.g., block 450). Further, in response to receiving an indication or a confirmation from the user 110 that the server 130 is authenticated, the haptic enabled device 120 requests additional information from the user (block 560), in a similar manner as set forth above in the context of FIG. 4 (e.g., block 460). Further, in response to the request for additional information from the user 110, the haptic enabled device 120 then receives the additional information from the user 110 (block 570). After receiving the additional information, the haptic enabled device 120 proceeds with the current process, which, without limitation, may be a financial transaction process (block 580). Alternatively, returning to block 550, if the haptic enabled device 120 does not receive an indication or a confirmation from the user 110 that the server 130 is authenticated, then the current process is ended and/or a transaction is canceled (block 590).

In an alternate embodiment, at block 550, the haptic enabled device 120 may not receive any explicit confirmation or indication from the user 110 that the server 130 is authenticated. In this case, the user 110 after being satisfied that the haptic feedback output provided by the haptic enabled device 120 matches with his or her predefined haptic feedback pattern may proceed to directly enter additional information as shown in block 570. Alternatively, the user 110 may proceed to directly end/cancel the transaction process if he or she determines that the haptic feedback output does not match with the predefined haptic feedback pattern, that is, the server 130 is not an authentic server.

Figure 6:
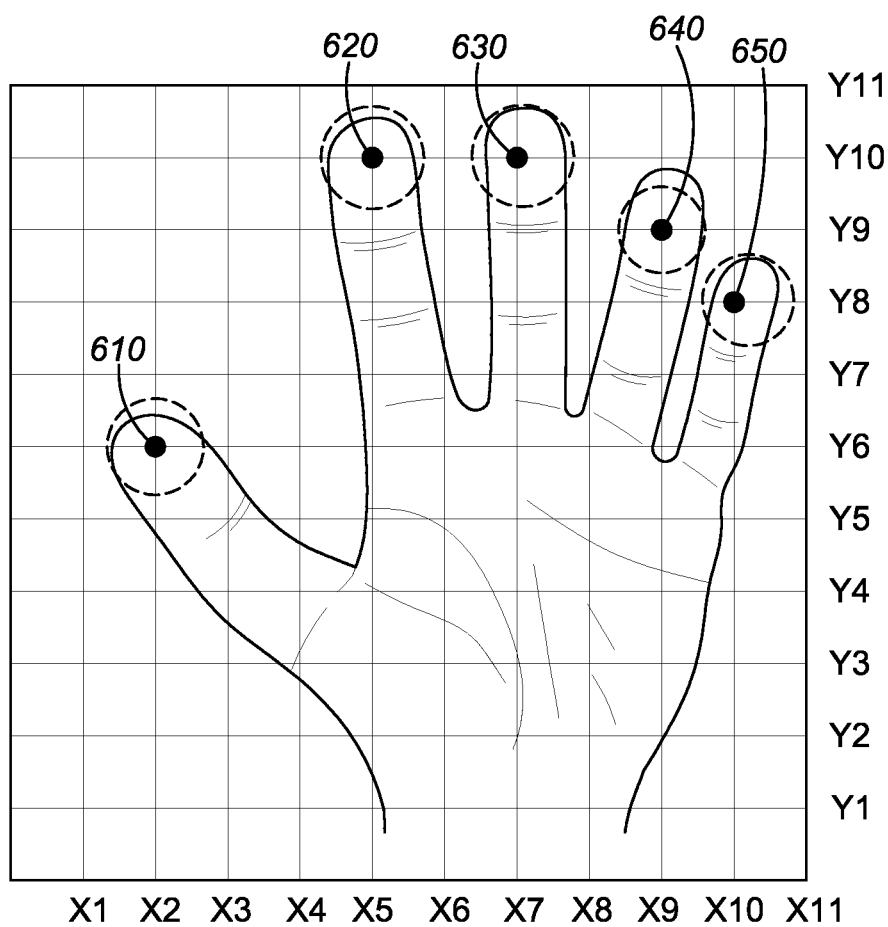
FIG. 6 is a depiction of a haptic feedback pattern in accordance with some embodiments.

FIG. 6 is a depiction of a haptic feedback pattern 600 in accordance with an embodiment implementing the localized haptic enabled devices. In this embodiment, the user 110 (FIG. 1) defines the haptic feedback pattern as a sequence of vibrations and/or motions with respect to different fingers of the user's palm. The haptic feedback pattern is further defined as a function of time (t) and magnitude (m) of the each vibration and/or motion in the defined haptic feedback pattern. For example, the user 110 may define the haptic feedback pattern as a vibration of a certain time duration (t1) and magnitude (m1) at the thumb 610, followed by a vibration of different time duration (t2) and magnitude (m2) (such as, a stronger vibration for a longer duration, and the like) at the index finger 620, etc. The haptic feedback pattern as defined by the user 110 is then stored in the database 340 at the server 300.

For mutual authentication between the user 110 and the server 130, the server 130 transmits the predefined haptic feedback pattern corresponding to the identity information of the user 110 to the haptic enabled device 120. The haptic enabled device 120 generates a haptic feedback output corresponding the haptic feedback pattern by re-defining the haptic feedback pattern in relation to the haptic feedback surface (such as a display screen, haptic enabled pad, and the like) of the haptic enabled unit 260, wherein the haptic feedback surface is divided into a plurality of rows x1, x2, x3, . . . , x11 and a plurality of columns y1, y2, y3, . . . , y11. In this embodiment, the haptic enabled device 120 defines the haptic feedback output relative to a plurality of contact locations 610, 620, 630, 640, and 650 when the user places his or her palm on the haptic feedback surface. Specifically, the haptic feedback output can be provided to the user 110 as a sequence of localized vibrations, for example, (x2, y6, t1, m1) at 610, (x5, y10, t2, m2) at 620, (x7, y10, t3, m3) at 630, (x9, y9, t4, m4) at 640, and (x10, y8, t5, m5) at 650, at different contact locations on the palm of the user. Accordingly, for the above example, the haptic enabled device 120 may generate a haptic feedback output providing a vibration of time duration t1 and magnitude m1 at location 610 (x2, y6) corresponding to the user's thumb, and another vibration of time duration t2 and magnitude m2 at location 620 (x5, y10) corresponding to user's index finger. The user 110 then compares the haptic feedback output provided by the haptic enabled device 120 with the haptic feedback pattern as predefined by the user 110 to determine whether the server 130 is authentic or not.

Implementation of the embodiments of the present disclosure described herein provide mutual authentication between a server and a user, and more particularly enable a user to authenticate a server prior to exchanging any sensitive information. Further, the mutual authentication process disclosed herein assures that the user information is not compromised or prone to misuse by ensuring that the user communicates with an authentic server.

Embodiments of the present disclosure can be advantageously implemented in systems performing financial transactions, for example, in Automated Teller Machines (ATM) connected to a transactional server. In this scenario, the user provides an identity information (such as swiping a debit card, etc.) to the ATM. In response, the ATM provides the identity information of the user to the transactional server, and receives a corresponding haptic feedback pattern as predefined by the user. The user then places his or her hand on a haptic enabled surface (haptic pad, display screen, etc.) of the ATM to receive a haptic feedback output generated by the ATM corresponding to the received haptic feedback pattern. The user then compares the received haptic feedback output with the haptic feedback pattern as predefined by the user to determine whether the haptic feedback output matches with the predefined haptic feedback pattern, and thus makes a determination whether the ATM is in communication with the authentic transactional server or not. Hence, with the disclosed mutual authentication process, a user can authenticate a server prior to exchanging any sensitive information, such as a personal identification number (PIN), for example.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus described herein. The non-processor circuits may include, but are not limited to, a radio receiver, a radio transmitter, signal drivers, clock circuits, power source circuits, and user input devices. As such, these functions may be interpreted as steps of a method to perform the mutual authentication described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processor" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of facilitating mutual authentication between a server and a user of a haptic enabled device, the method comprising:
   receiving and storing in a database, by the server, a predefined finger specific haptic feedback pattern of the user, wherein the predefined finger specific haptic feedback pattern of the user comprises at least one of a predefined sequence of vibrations and a predefined sequence of motions;
   receiving identity information of the user at the haptic enabled device, the haptic enabled device configured to generate a haptic feedback output, to the user, the haptic enabled device comprising a haptic feedback pad configured to generate the haptic feedback output localized to a plurality of contact locations;
   transmitting, by the haptic enabled device, the identity information of the user to the server;
   accessing, by the server, from the database the predefined finger specific haptic feedback pattern of the user based on the identity information of the user;
   receiving, at the haptic enabled device, the predefined finger specific haptic feedback pattern corresponding to the identity information of the user from the server; and
   generating, at the haptic enabled device, the haptic feedback output at each of the plurality of contact locations of the haptic feedback pad corresponding to a respective finger in the predefined finger specific haptic feedback pattern by:
      identifying, by the haptic enabled device, one or more contact locations at the haptic feedback pad corresponding to one or more specific fingers of the user specified in the predefined finger-specific haptic feedback pattern, and
      selectively activating, at the haptic feedback pad, actuator transducers corresponding to the identified contact locations to generate the haptic feedback output.

2. The method of claim 1, further comprising:
   receiving, at the device an indication from the user that the server is authenticated in response to the user detecting the haptic feedback output; and
   requesting the user to provide additional information to the device in response to receiving the indication.

3. The method of claim 2, wherein the additional information comprises information required to complete a transaction.

4. The method of claim 1, wherein the identity information of the user comprises at least one of a personal identification number (PIN), password, audio identifier, signature, and pressure profile of the user.

5. The method of claim 1, wherein the haptic feedback output comprises a sequence of localized vibrations, further wherein the sequence of localized vibrations is a function of at least one of a location (x,y), time duration (t), and magnitude (m) of the haptic feedback output.

6. The method of claim 1, wherein the haptic feedback pad is divided into a plurality of rows and a plurality of columns, the method further comprising defining the predefined finger specific haptic feedback pattern in relation to the plurality of rows and the plurality of columns of the haptic feedback surface.

7. A system for facilitating mutual authentication, the system comprising:
a server configured to identify a predefined finger specific haptic finger pattern; and
a haptic enabled device comprising:
a user input device configured to receive identity information of a user;
a transceiver configured to transmit the identity information of the user to the server and receive the predefined finger specific haptic feedback pattern corresponding to the identity information of the user from the server when the server identifies the predefined finger specific haptic feedback pattern by accessing a database based on the identity information of the user, wherein the predefined finger specific haptic feedback pattern of the user comprises at least one of a predefined sequence of vibrations and a predefined sequence of motions;
a haptic feedback pad configured to generate haptic feedback output localized to a plurality of contact locations, each of the plurality of contact locations corresponding to a respective finger specified in the predefined finger specific haptic feedback pattern; and
actuator transducers at the haptic feedback pad, the actuator transducers selectively activated by the haptic enabled device to generate the haptic feedback output.

8. The system of claim 7, further comprising a processor configured to:
receive an indication from the user that the server is authenticated in response to the user detecting the haptic feedback output; and
request the user to provide additional information in response to receiving the indication.

9. The system of claim 7, wherein the identity information of the user comprises at least one of a personal identification number (PIN), password, audio identifier, signature, and pressure profile of the user.

10. The system of claim 7, wherein the haptic feedback output comprises a sequence of localized vibrations, further wherein the sequence of localized vibrations is a function of at least one of a location (x,y), time duration (t), and magnitude (m) of the haptic feedback output.

11. The device of claim 7, wherein the haptic feedback pad is divided into a plurality of rows and a plurality of columns, the method further comprising defining the predefined finger specific haptic feedback pattern in relation to the plurality of rows and the plurality of columns of the haptic feedback surface.

12. The device of claim 7, wherein the haptic enabled device is further configured to identify one or more contact locations at the haptic feedback pad based on the predefined finger specific haptic feedback pattern.

13. A method of facilitating mutual authentication between a server and a user of a haptic enabled device, the method comprising:
receiving and storing, in a database by the server, a predefined finger specific haptic feedback pattern of the user comprising at least one of a predefined sequence of vibrations and a predefined sequence of motions;
receiving, at the server, identity information of the user from the haptic enabled device;
accessing, by the server, from the database the predefined finger specific haptic feedback pattern based on the identity information of the user;
providing, by the server, the predefined finger specific haptic feedback pattern corresponding to the identity information of the user to the haptic enabled device, such that a haptic feedback output corresponding to the predefined finger specific haptic feedback pattern is generated at the haptic enabled device, the predefined finger specific haptic feedback pattern configured to generate the haptic feedback output localized to a plurality of contact locations of a haptic feedback pad of the haptic enabled device, wherein each of the plurality of contact locations of the haptic feedback pad corresponds to a respective finger specified in the predefined finger specific haptic feedback pattern;
wherein the haptic enabled device is configured to selectively activate actuator transducers disposed at the haptic feedback pad of the haptic enabled device to generate the haptic feedback output.

14. The method of claim 13, wherein the identity information of the user comprises at least one of a personal identification number (PIN), password, audio identifier, signature, and pressure profile of the user.

15. The method of claim 13, wherein the haptic feedback output comprises a sequence of localized vibrations, further wherein the sequence of localized vibrations is a function of at least one of a location (x,y), time duration (t), and magnitude (m) of the haptic feedback output.

* * * * *